United States Patent [19]

Draper

[11] 4,142,444

[45] Mar. 6, 1979

[54] AUTOMATIC TRIMMING DEVICE FOR LAMINATED BOARDS

[75] Inventor: Harold E. Draper, 3080 Hwy. 94 North, St. Charles, Mo. 63301

[73] Assignees: Michael Draper; Harold Elmer Draper, Jr., both of St. Charles, Mo.

[21] Appl. No.: 842,125

[22] Filed: Oct. 14, 1977

[51] Int. Cl.$^2$ .................... B23C 1/027; B27C 5/00
[52] U.S. Cl. ................... 90/15 R; 144/2 R; 144/130; 144/134 R; 144/144 R
[58] Field of Search ............ 144/2 R, 134 R, 144 R, 144/321, 323, 137, 114, 117 R, 117 B, 130; 51/100 P; 90/13 R, 15 R; 83/368, 914

[56] References Cited

U.S. PATENT DOCUMENTS

| 3,299,779 | 1/1967 | Wolf | 144/134 R X |
| 3,610,098 | 10/1971 | Walker | 90/15 R |

Primary Examiner—Othell M. Simpson
Assistant Examiner—W. D. Bray
Attorney, Agent, or Firm—Michael Kovac

[57] ABSTRACT

An automatic trimming device for laminated boards includes automatically adjustable cutting means for trimming excess material from laminated boards during manufacture thereof, regardless of the thickness of the laminated boards.

5 Claims, 3 Drawing Figures

AUTOMATIC TRIMMING DEVICE FOR LAMINATED BOARDS

SUMMARY OF THE INVENTION

Laminated boards, such as used on sink tops, doors, window sills, etc., presently are manufactured by feeding sheets of particle board and plastic laminated through a machine with roller guides that permit the sheets of particle board and plastic laminate to be glued together in a flat position as the sheets are conveyed through the laminate board forming machine. In addition to gluing the plastic laminate to the face of the particle board, the laminate board forming machine also forms and glues the plastic laminate to the edges of the particle board, leaving excess plastic extending beyond the lower face of the particle board which must be trimmed off flush.

At present, each time there is a change in particle board and plastic laminate thickness, the trimming device must be manually adjusted, thus resulting in machine down time until the correct setting is made for the trimming device.

The present invention is directed to an automatic trimming device for laminated boards that automatically trims excess plastic from laminated boards during the manufacture thereof without manual adjustment.

Accordingly, it is an object of the present invention to provide an automatically adjustable trimming device laminated board forming machine.

Another object of the present invention is to provide the aforementioned automatically adjustable trimming device as a kit or attachment to existing laminated board forming machines, as well as being included on original equipment.

A further object of the present invention is to provide the aforementioned automatically adjustable trimming device with a minimum part construction to facilitate cost of manufacture and maintenance.

These and other objects and advantages of the present invention are attained by the provision of an automatic trimming device for excess plastic laminate extending downwardly from the lower face of a particle board including a housing having spaced pivotally mounted shafts which are linked together for simultaneous movement, one of the shafts having a feeler element extending normal therefrom for engaging the lower face of the particle board, the other shaft having means for mounting a trimming device relative to the excess plastic laminate extending downwardly from the lower face of the particle board, the top of the feeler element being in general vertical and horizontal alignment with the trimming device, and spring means attached between the pivotally mounted shaft linkage and the laminated board forming machine to normally urge the feeler element against the lower face of the particle board, whereby when the feeler element is engaged by the lower face of the particle board the trimming device is simultaneously raised or lowered in vertical and horizontal alignment relative to the feeler element.

DESCRIPTION OF THE PREFERRED EMBODIMENTS

In order to trim excess plastic laminate flush with the lower face of a particle board or the like, there is presently utilized a manually adjustable trimming device which is adjusted to the thickness of the particle board. Not only is this a time consuming process, it requires several manual adjustments to obtain the exact position desired.

Since laminated board forming machines employ conveyor and forming guides for high speed positioning and gluing of the laminated plastic to the particle board along the upper face and side edges thereof, there presently exists a need for a compatible high speed trimming device which avoids the manual adjustment and thereby the down time of laminated board forming machines.

Figure 1:
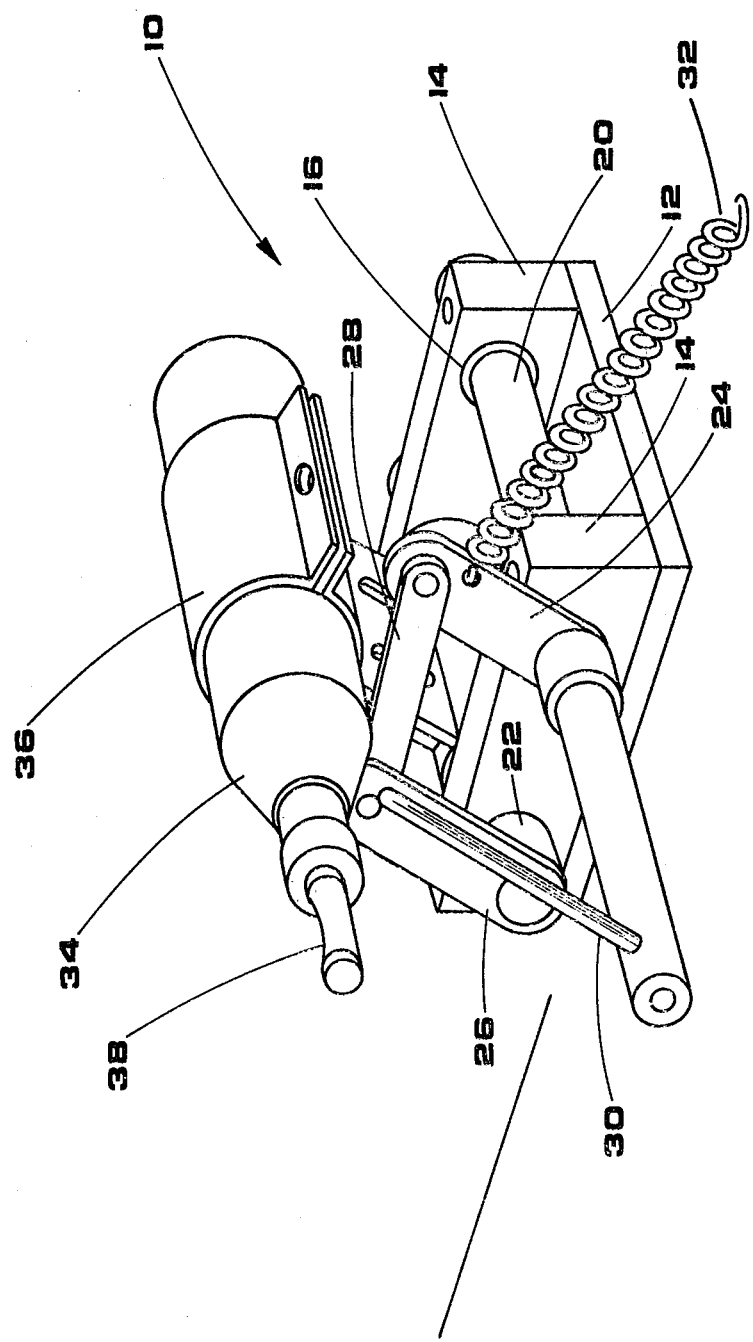
FIG. 1 is a front perspective view of the automatic trimming device for laminated boards which is constructed in accordance with the teachings of the present invention.
Figure 2:
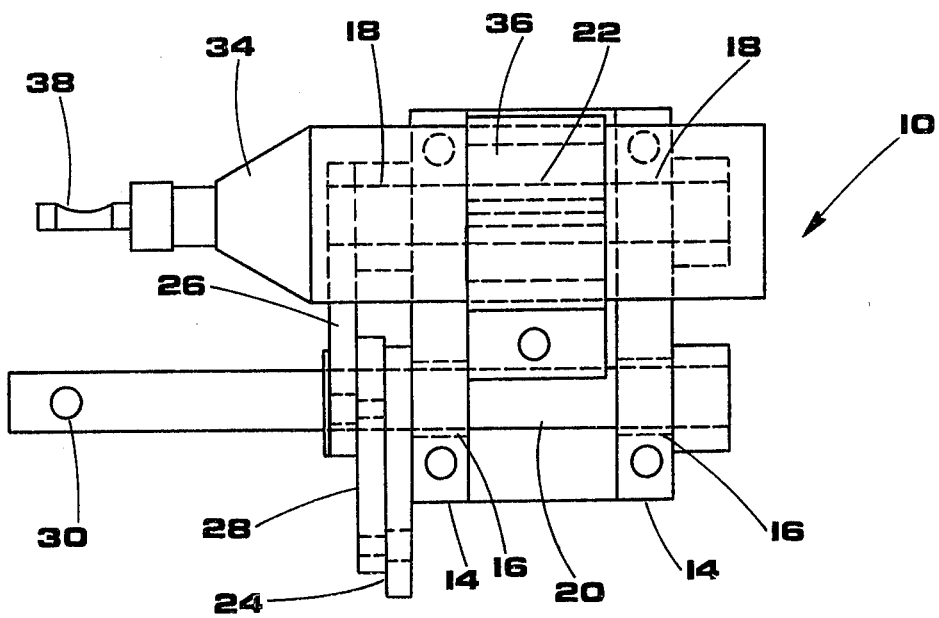
FIG. 2 is a top plan view of the device shown in FIG. 1.
Figure 3:
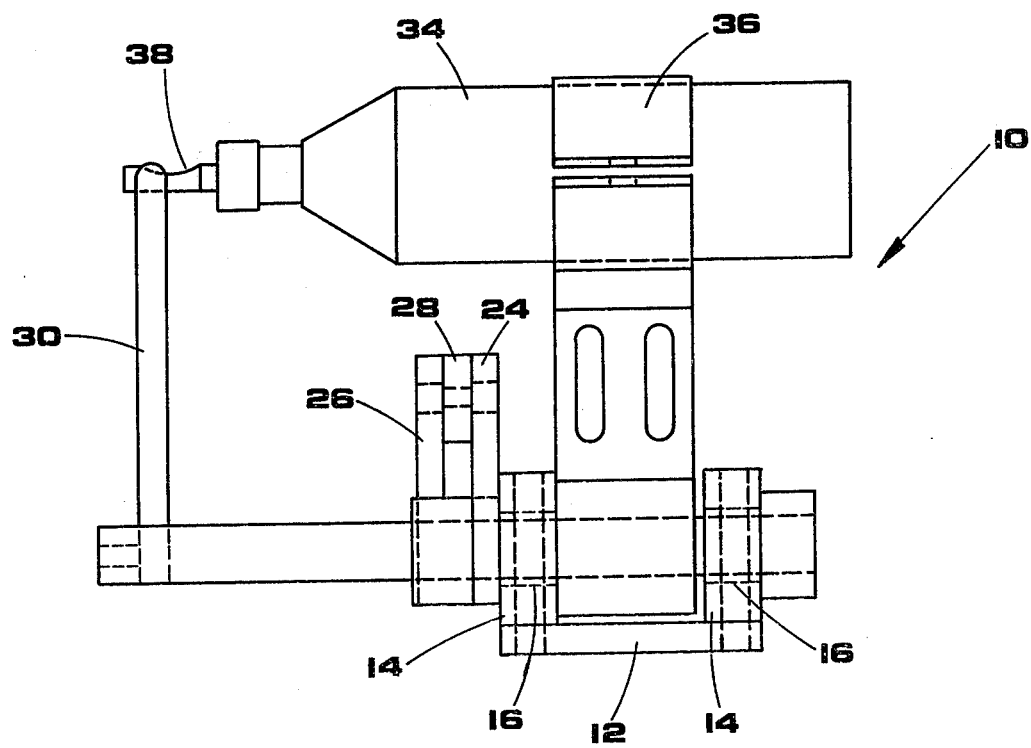
FIG. 3 is a side view of the device shown in FIG. 1.

In accordance with the present invention, the laminated board automatic trimming device is shown in FIGS. 1 - 3 of the drawings and is generally identified by the numeral 10. The automatic trimming device 10 includes a housing 12 having spaced pillow blocks 14, 14 in which pairs of spaced and aligned holes 16, 16 and 18, 18 respectively are provided. Each pair of spaced and aligned holes 16, 16 and 18, 18 receives a pivotally mounted shaft element. As shown in the drawings, the pivotally mounted shaft 20 is received within the spaced and aligned holes 16, 16, while the pivotally mounted shaft 22 is received within the spaced and aligned holes 18, 18.

The pivotally mounted shafts 20, 22 are linked together by mechanical or hydraulic linkage to assure simultaneous rotational movement thereof for reasons which will presently appear. As shown in the drawings, the linkage between the shafts 20 and 22 includes a fulcrum arm 24 fixedly mounted on shaft 20 and a fulcrum arm 26 fixedly mounted on shaft 22 which are connected to each other by a common drag link 28 at one end thereof. Thus, as one of the shafts 20 or 22 rotate, the other shaft rotates simultaneously therewith and over the same distance.

This simultaneous movement of the shafts 20, 22, in conjunction with the sensing and trimming elements of the automatic trimming device, assures automatic and accurate trimming regardless of the thickness of the laminated board, as will now be explained.

It will be noted that shaft 20 is longer than shaft 22 and extends away from the housing 12 by a predetermined distance for mounting a feeler element 30 at the free end thereof. The feeler element 30 extends substantially normal to and in an upward direction relative to the shaft 20 for engaging the lower face of a particle board or the like (not shown). Spring means 32 is employed between the pivotally mounted shaft linkage (24, 26 and 30) and the laminated board forming machine (not shown) to position the feeler element against the lower face of the particle board. Thus, the feeler element 30 is raised or lowered, depending on the thickness of the particle board, and the shaft 22, through the linkage 24, 26 and 28, is rotated simultaneously and by the same distance as shaft 20.

This is important because the trimming device, shown as routing device 34, is mounted on shaft 22, for a wide range of movement, by way of the circumferential engaging means 36 which is fixedly mounted on shaft 22 between the pillow blocks 14 and extends upwardly therefrom to support the trimming device 34 in alignment with the feeler element 30.

More specifically, the trimming or routing cutter 38 is arranged, due to the aforesaid construction, to be in general vertical and horizontal alignment with the top of the feeler element 30 in order that the trimming or routing cutter 38 can trim excess laminate plastic flush with the lower face of the particle board associated therewith. Note that the trimming or routing cutter 38 extends slightly outwardly of the feeler element 30 in order to trim excess plastic at the juncture of the plastic laminate and particle board (not shown).

If desired, the feeler element 30 may operate a limit switch or solenoid control valve to regulate the flow of electricity or air to an electrically or pneumatically operated trimming device 34, in order to further automate the operation of the device and conserve energy.

From the foregoing, it will be appreciated that the automatic trimming device of the present invention provides automatic and accurate trimming of excess laminate plastic attached to particle boards during the manufacture thereof, regardless of the thickness of the laminated board.

I claim:

1. An automatic trimming device for laminated board forming machines in which laminated plastic is attached to particle board and the like with excess plastic laminate extending downwardly from the lower face of the particle board, comprising an automatic trimming device for the excess plastic laminate including a housing having spaced pivotally mounted shafts which are linked together for simultaneous movement, one of the shafts having a feeler element extending normal therefrom for engaging the lower face of the particle board, the other shaft having means for mounting a trimming device relative to the excess plastic laminate extending downwardly from the lower face of the particle board, the top of the feeler element being in general vertical and horizontal alignment with the trimming device, and spring means attached between the pivotally mounted shaft linkage and the laminated board forming machine to position the feeler element against the lower face of the particle board, whereby when the feeler element is engaged by the lower face of the particle board, the trimming device is simultaneously raised or lowered in vertical and horizontal alignment relative to the feeler element.

2. The device as defined in claim 1 wherein the trimming device includes trimming means extending slightly outwardly of the feeler element to trim the excess plastic laminate at the juncture of the plastic laminate and particle board.

3. The device as defined in claim 1 wherein the pivotally mounted shafts are mechanically linked together by a fulcrum arm mounted relative to each shaft at one end thereof and having the other end of each fulcrum are joined to a common drag link therebetween.

4. The device as defined in claim 1 wherein the housing includes spaced pillow blocks having pairs of spaced and aligned holes for receiving the pivotally mounted shafts, said means for mounting the trimming device to one shaft being mounted on said shaft between the spaced pillow blocks.

5. The device as defined in claim 4 wherein said means for mounting the trimming device between the spaced pillow blocks includes circumferential engaging means for the trimming device which is spaced upwardly from the pivotally mounted shafts to provide vertical and horizontal alignment of the trimming device with the feeler element.

* * * * *